United States Patent [19]
Tanikoshi

[11] 3,898,544
[45] Aug. 5, 1975

[54] DC BRUSHLESS MOTOR

[75] Inventor: Kinzi Tanikoshi, Tokyo, Japan

[73] Assignees: Canon Kabushiki Kaisha; Canon Seiki Kabushiki Kaisha, both of Tokyo, Japan

[22] Filed: Feb. 5, 1973

[21] Appl. No.: 329,844

[30] Foreign Application Priority Data
Feb. 3, 1972 Japan.............................. 47-12408

[52] U.S. Cl. ................. 318/254; 318/138; 318/439
[51] Int. Cl. .......................................... H02k 29/00
[58] Field of Search .......... 318/254, 138, 676, 685, 318/439

[56] References Cited
UNITED STATES PATENTS

| | | | |
|---|---|---|---|
| 3,386,019 | 5/1968 | Hill | 318/254 |
| 3,418,550 | 12/1968 | Kolatorowicz et al. | 318/254 |
| 3,453,514 | 7/1969 | Rakes et al. | 318/254 |
| 3,461,367 | 8/1969 | Takeyasu et al. | 318/254 |
| 3,643,143 | 2/1972 | Rakes | 318/254 |
| 3,667,011 | 5/1972 | Casaday | 318/254 |
| 3,667,018 | 5/1972 | Rakes | 318/254 |
| 3,719,870 | 3/1973 | Bregeault | 318/254 |
| 3,720,865 | 3/1973 | Bregeault | 318/254 |

*Primary Examiner*—G. R. Simmons
*Attorney, Agent, or Firm*—Fitzpatrick, Cella, Harper & Scinto

[57] ABSTRACT

A DC Brushless motor comprising a rotor comprising a permanent magnet, a field coil for producing torque for rotation of said rotor, and Hall generators for detecting a rotational position of said rotor. Two Hall generators are arranged in the periphery of the rotor in a spaced relation of 90°. The field coil comprises two coils connected in parallel with a power source. To produce a torque by means of said respective coils to successively rotate the rotor in the same direction, a driving means is provided to serve to flow an exciting current in a reverse direction by displacement of phase by 180° in the same coil. This driving means is adapted to control a direction of current flowing in the coil by an output of said Hall generators. To maintain a rotational speed of rotor at a constant rate, there are provided means for detecting number of revolution of rotor and speed control means which produces a signal for a constant speed control comparing output from said detector with a reference signal.

7 Claims, 11 Drawing Figures

ROTATING ANGLE $\frac{\pi}{2}$

$\frac{2}{3}\pi$

DC BRUSHLESS MOTOR

BACKGROUND OF THE INVENTION

1. Field of the Invention

This invention relates to a DC brushless motor in which a rotational position of rotor is detected by detecting means for rotational position such as Hall elements. an output of said detecting means is electrically treated so as to flow an exciting current into field coils.

2. Description of the Prior Art

A DC brushless motor so far known is such that a rotational position of rotor comprising a permanent magnet is detected using Hall effect elements or field detecting element such as induction windings, and excitation controlling of excitation windings of stator is carried out by an output from said detecting element. In such a conventional brushless motor, a number of the exciting coils for rotating and driving a rotor having permanent magnet are disposed in the periphery of the rotor. For example, to detect a rotational position of two-poled rotor, generally a system is employed, in which Hall generators are arranged in the periphery of the rotor and in a position rotated by 90°, magnetic flux which varies with every rotational phase of 90° of the rotor is detected, and the output corresponding to the detected variation is electrically treated by means of, for instance, amplification, then a current is applied to at least four rotor driving coils arranged in the periphery of the rotor to cope with said phase variation of 90° to drive the rotor. In other words, according to the prior art, it has been necessary to independently arrange at least four coils in order to drive the rotor. Since such a conventional DC brushless motor has employed its driving system in which coils in excess of four in number are arranged, into which a driving current is successively applied, the rate of utilization of said coils has been low in comparison with a conventional DC motor. Such a conventional DC brushless motor is disclosed, for example, in "ATM" (page 79–82, issued April 1968) published in West Germany, a prior art with respect to winding shape of coil is disclosed in U.S. Pat. No. 3,191,081, and the prior art with respect to brushless motors provided with Hall generators is disclosed in U.S. Pat. No. 3,517,289.

SUMMARY OF THE PRESENT INVENTION

The primary object of the invention is to provide an improved DC brushless motor in which coils adapted to drive a motor are reduced in number to the utmost, two exciting coils at the minimum are used to produce sufficient driving torque with respect to the rotor, which results in driving means having a high rate of utilization of coil being realized and in a simplified form in view of construction.

A further object of the invention is to provide a DC brushless motor comprising field coils two in number for producing torque for the purpose of driving a rotor, magnetic conversion elements such as Hall generators for detecting magnetic field which varies with the rotational position of permanent magnet rotor, means for intermittently feeding a current to two coils according to the rotational phase of rotor in a relation responsive to the output from said magnetic conversion elements, and control means for automatically switching and controlling a direction of current flowing in said coils according to the rotational phase of said rotor, whereby the rotor may fully be rotated and driven.

A further object of the invention is to provide a DC brushless motor comprising magnetic conversion elements for detecting the rotational position of rotor comprising a permanent magnet, driving means having a driving circuit for electrically treating an output signal from said elements and for applying an exciting current to produce torque for driving a rotor in the magnetic field coils at a desired phase, means for detecting number of revolution of the rotor, and speed control means for comparing a reference signal with an output signal from said detecting means for number of revolution so that said driving means may be controlled to maintain the number of revolution of rotor at a constant rate.

Other objects or features of the invention will become apparent from the following particular description and accompanying drawings.

DESCRIPTION OF THE PREFERRED EMBODIMENTS

Figure 1:
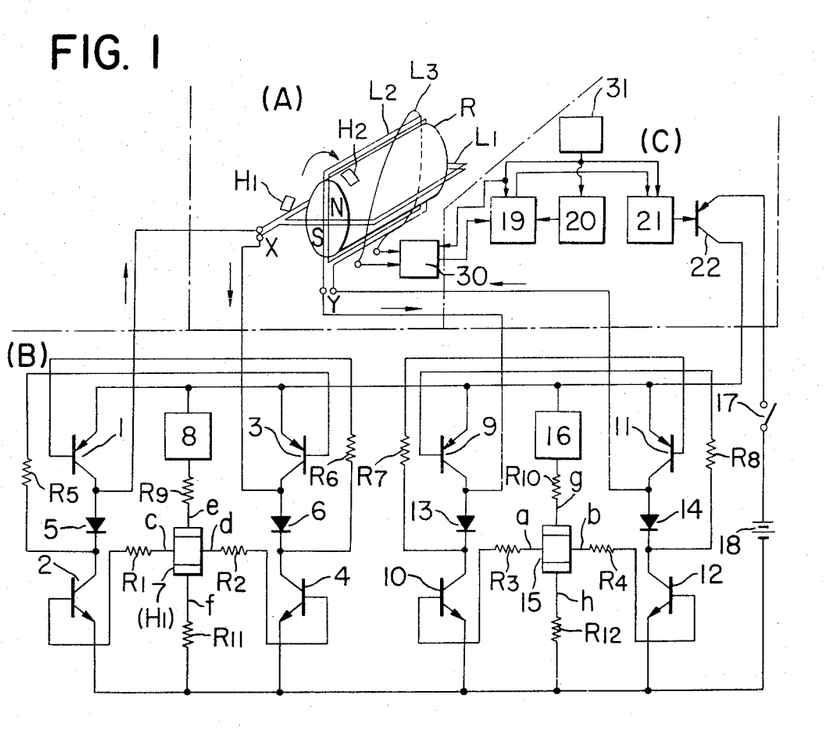
FIG. 1 shows one example of electric connection diagrams for driving means and speed control means of a DC brushless motor according to the present invention.

FIG. 1 is a circuit diagram of the DC brushless motor with magnetic conversion elements such as Hall generators used as detecting means for rotational position of a permanent magnet rotor.

Referring now to FIG. 1, portions (A), (B) and (C) divided by the one-dot break line show a motor main portion including a rotor, a stator coil and Hall generators; driving means portion for detecting a rotational position of rotor and for controlling an exciting current to be applied to the coil; and speed control means portion for motor, respectively. The motor main portion (A) is provided with a permanent magnet rotor R magnetized by two poles as shown, two Hall generators $H_1$ and $H_2$ arranged in the periphery of the rotor in a position of 90° rotating angle, and a stator comprising two coils $L_1$ and $L_2$ for driving the rotor having a portion for producing effective torque in an axial direction of rotation of said rotor R and being positioned meeting at right angles so that said torque producing portion may be arranged in the periphery of the rotor in a position of rotating angle of 90°. Said coils have their terminals X and Y, which are connected to driving means to hereinafter be described. Terminals for each Hall generators and wirings connected to said terminals in the portion (A) are omitted for readiness of understanding the drawing but are further to be shown and described in connection with the driving means hereinafter described.

Then, the construction of portion (B) which shows driving means for motor will be described. This driving means is provided with two bridge type driving circuits having semiconductor elements on itsi opposite side in order to process outputs from said two Hall generators. Each of said driving circuits has P-N-P transistors 1, 3, 9 and 11 on its one side and N-P-N transistors 2, 4, 10 and 12 on its other side. The transistors 1 and 2, 3 and 4, 9 and 10, and 10 and 12 have their collector terminals connected via diodes 5, 6, 13 and 14, respectively, which determine a direction of current flow. Said Hall generator $H_1$ and $H_2$ are designated by numerical references 7 and 15, respectively, in the driving circuit, and the one Hall generator 7 ($H_1$) has output terminals $c$ and $d$, which are connected to base terminals of said transistors 2 or 4 through respective resistors $R_1$ or $R_2$. Similarly, output terminals $a$ and $b$ of the other Hall generator 15 ($H_2$) are connected to base terminals of the transistors 10 or 12 through resistors $R_3$ or $R_4$. The collector terminals of the transitors 2 or 4 are connected to base terminals of respective transistors 3 or 1 through resistors $R_5$ or $R_6$. Similarly, collector terminals of the transistors 10 or 12 are connected to base terminals of respective transistors 11 or 9 through resistors $R_7$ or $R_8$. The terminal X of said exciting coil $L_1$ has one connected to the collector terminal of the transistor 1, as shown, and the other connected to the collector terminal of the transistor 3. Similarly, the terminal Y of the coil $L_2$ has its contacts respectively connected to the collector terminals of the transistors 9 and 11 which forms another driving circuit. The one input terminals $e$ and $g$ of said Hall generators 7 and 15 are connected, through the resistors $R_9$ and $R_{10}$, to switching circuits 8 and 16 for speed control formed by a known circuit construction such as Schmidt circuit which turns ON at a constant level and turns OFF at a level below the former, and said circuits are connected to the plus terminal of power source 18 through a control transistor 22 and a power switch 17, which will be described later. The other input terminals f and h of said Hall generators 7 and 15 are connected to the minus terminal of the power source 18 through the resistors $R_{11}$ and $R_{12}$ respectively.

The portion (C), which forms speed control means, comprises a mixing circuit 30 connected to the coil $L_3$ for a tacho generator wound in a shape such as to diagonally cross with respect to said coils $L_1$ and $L_2$, a comparator circuit 19 connected to said circuit 30 and a reference signal producing circuit 20 for producing a reference signal of a constant period, an amplifier 21 for amplifying the output from said comparator circuit, a control transistor 22 having its base terminal connected to the amplifier 21, and a power source 31 for supplying power to those circuits 30, 19, 20 and 21 as described.

The motor main portion as shown in the portion (A) of FIG. 1 will now be described in detail with reference to FiGS. 2, 3 and 4. The rotor R is rotatably mounted on the shaft sh, and the aforesaid coils $L_1$ and $L_2$ are wound as shown outside the periphery of said rotor R. The construction will be more clearly understood by viewing FIG. 3 which illustrates the construction of only these coils $L_1$ and $L_2$ taken out. Although these coils are seen at a glance as if four individual coils, a pair of coils $L_{1a}$ and $L_{1b}$ are, in effect, connected each other, and also the other pairs of coils $L_{2a}$ and $L_{2b}$ are connected each other, thus only forming two sets of coil groups. Effective torque necessary for rotating said rotor is produced in a linear portion extending in a direction of rotor shaft S$h$ within said coils. The torque producing portions $G_1$ and $G_1$ of the coil $L_1$ are in symmetry with the shaft S$h$, and the torque producing portions $G_2$ and $G_2$ of the coil $L_2$ are arranged in symmetry with the shaft S$h$ in 90° spaced relation with $G_1$, thus this will result in the effective torque producing portions of the different coils being arranged in the periphery of the rotor in a spaced relation of every 90°. The division of coils $L_1$ and $L_2$ into respective two sets of individual coils $L_{1a}$ and $L_{1b}$ or $L_{2a}$ and $L_{2b}$ is based on the consideration in veiw of balance in construction, and there is possibly used in the form of a group of coils as a minimum unit, such as using only $L_{1a}$ and $L_{2a}$. In the case a coil unit of $L_{1a}$ and $L_{1b}$ is used for coil $L_1$ and a coil unit of $L_{2a}$ and $L_{2b}$ is used for coil $L_2$, coils $l_{1a}$ and $l_{1b}$ are connected by lead wires $la$, $lb$ and coils $l_{2a}$ and $l_{2b}$. Another connecting means Co will be described hereinafter.

Figure 2:
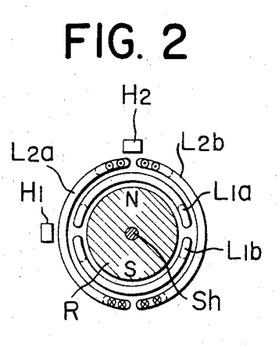
FIG. 2 is a front view illustrating an arrangement of a rotor, field coils, and detecting means for rotational position of rotor for the DC brushless motor according to the invention.
Figure 3:
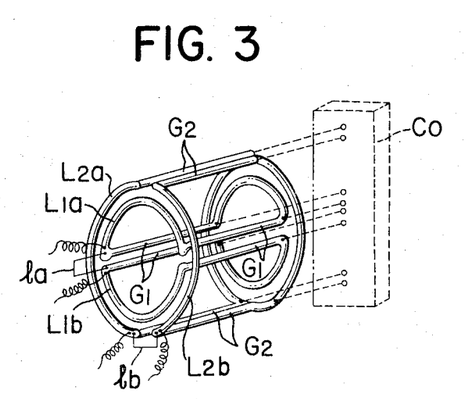
FIG. 3 is a perspective view showing an arrangement of field coils and its switching means of the DC brushless motor shown in FIG. 2.
Figure 4:
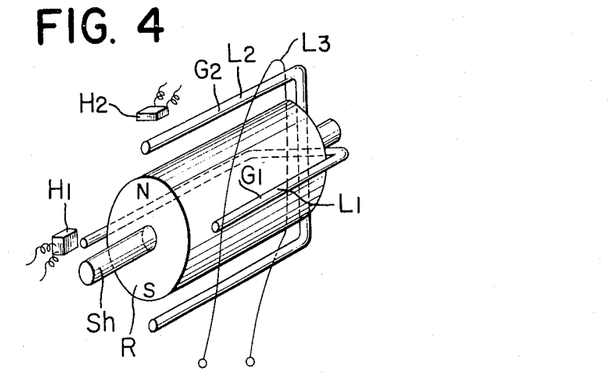
FIG. 4 is a perspective view of the DC brushless motor as shown in FIGS. 2 and 3 with a tacho generator added.

FIG. 4 is a perspective view showing the simplified construction of the coils shown in FIGS. 2 and 3, and further illustrating the condition of the coil $L_3$ of the tacho generator for speed control being arranged diagonal to the coils $L_1$ and $L_2$.

Figure 5A:
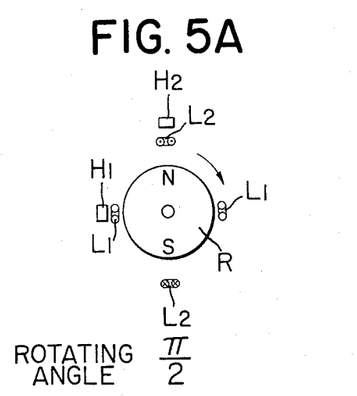
FIGS. 5A to 5D are explanatory views, in which one rotation of rotor of the DC brushless motor as shown in FIG. 2 is equally divided into four and a current passing through the coils is shown with its direction in a position of each rotation of the rotor.

The operation of the DC brushless motor with the construction as described above will now be described with reference to FIGS. 1 and 5. It is supposed that N-pole of the rotor R is positioned in opposed to the Hall generator $H_2$ as shown in FIGS. 1, 2 and 5A. Then, there is present such a characteristic that flux moving from N-pole towards S-pole is detected by Hall generator $H_2$, Hall voltage as shown in FIG. 6B is produced with respect to the magnetic pole in output terminals $a$ and $b$ of the Hall generator 15 $H_2$ shown in FIG. 1, thereby voltages V$a$ and V$b$ appearing at terminals $a$ and $b$ respectively is expressed by V$a$ > V$b$. Accordingly, the Hall voltage at terminal a is applied to the base terminal of the transistor 10 in the driving circuit so that when said voltage exceeds the threshold voltage, transistor 10 will be rendered conductive and the collector potential will drop, and the base potential of transistor 11 will be lowered, then the transistor 11 being also rendered conductive (hereinafter called ON condition). At this time it is also supposed that the power switch 17 is closed and the control transistor 22 is in ON condition. In this condition, there is formed a current circuit, that is, plus terminal of power source 18 — switch 17 — transistor 22 — transistor 11 — coil $L_2$ — diode 13 — transistor 10 — minus terminal of power source 18, and a current as indicated by a full line flows into the coil $L_2$ and with torque produced by said exciting current the rotor R is rotated in a direction as indicated by the full line in FIGS. 1 and 5A.

Figure 5B:
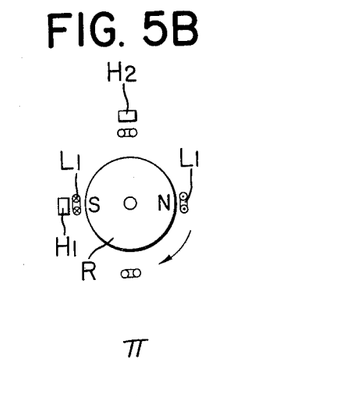

Next, when S-pole comes to a position opposed to the Hall generator $H_1$, a voltages which are expressed by $Vc > Vd$ are produced in output terminals c and d of the Hall generator 7 ($H_1$). When the output voltage $Vd$ at terminal d exceeds the threshold voltage of the transistor 4, the transistor 4 will be rendered in ON condition and the transistor 1 will then be rendered in ON condition. Thus, there is formed a circuit, that is, plus terminal of power source 18 — switch 17 — transistor 22 — transistor 1 — coil $L_1$ — diode 6 — transistor 4 — minus terminal of power source 18, and a driving current as indicated by a full line is flown whereby the rotor R is further rotated as shown in FIG. 5B.

Figure 5C:
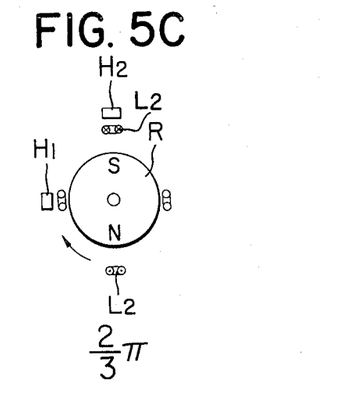

Then, when S-pole of the rotor R comes to a position in opposite to the Hall generator $H_2$, voltages expressed by $Va > Vb$ are produced at output terminals a and b of said Hall generator 15 ($H_2$) so that the transistor 12 and transistor 9 will successively be turned ON condition and a current in a direction opposite to that of the aforesaid full line flows into the coil $L_2$ for driving the rotor to produce torque whereby the rotor R is further rotated as shown in FIG. 5C.

Figure 5D:
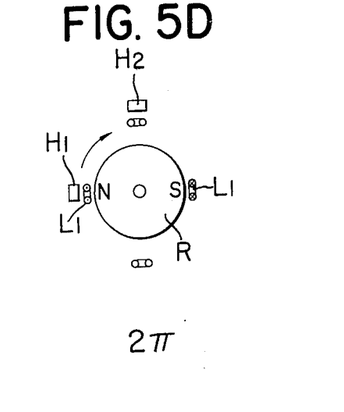

Next, when N-pole of the rotor comes to a position in opposed to the Hall generator $H_1$, output voltages expressed by $Vc < Vd$ are produced at output terminals c and d of the Hall generator 7 ($H_1$) so that the transistor 2 and transistor 3 will successively be turned to an ON condition and a current in a direction opposite to that of the aforesaid full line flows into the coil $L_1$ for driving the rotor to produce torque whereby the rotor R is rotated as shown in FIG. 5D, which will result in a return to the original position (see FIG. 5A). In this way, the rotor continues to be rotated in a direction as indicated by the arrow.

Figure 6A:
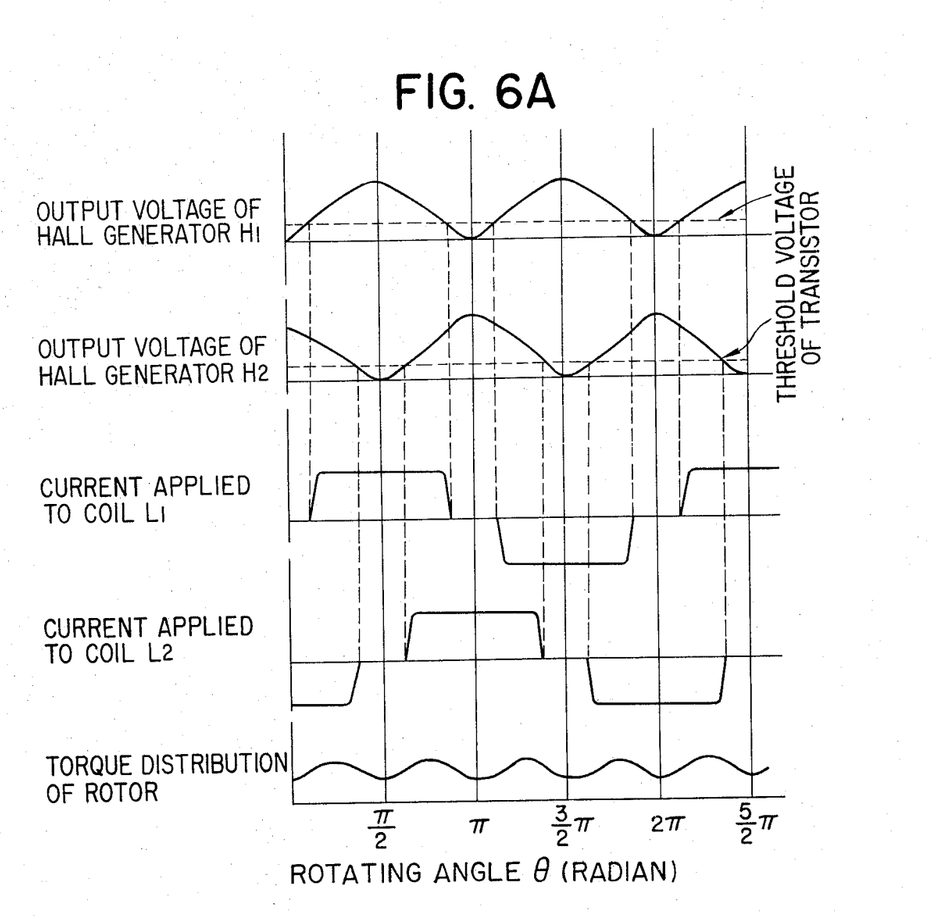
FIG. 6A is a graphical representation showing angle of rotation of rotor of the DC brushless motor according to the invention on axis of abscissa, and output signal of Hall generator, current applied to field coils, and torque distribution of rotor on axis of ordinate.
Figure 6B:
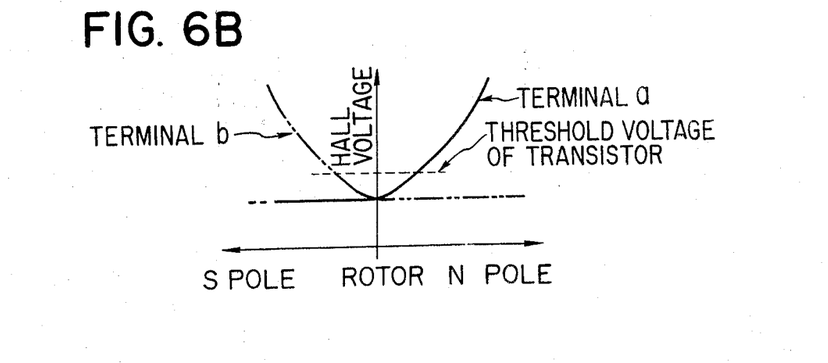
FIG. 6B is a graphical representation showing magnetic poles of rotor on axis of abscissa, and output signal of Hall generators on axis of ordinate.

The foregoing description is based on the rotation of rotor every 90°, but a continuous full rotation of this may be understood by reference of FIG. 6A. Output voltages $Vd$ and $Va$ at terminals d and a of the Hall generators $H_1$ and $H_2$ are out of phase by 90° with each other. This results in currents flowing in the coils $L_1$ and $L_2$ being also out of phase by 90°. Since this driving current is reversed in direction every 180° rotation of rotor, the current in a reversed direction is depicted on the negative side in the drawing. Torque is produced by said driving current to rotate the permanent magnet rotor R in the same direction.

In order to perform a speed control of motor, which performs the foregoing operation, a value of detection obtained by detecting the number of revolution of the rotor and a reference signal from a reference signal producer 20 for producing a reference signal of a constant period corresponding to the number of revolution desired are applied to a comparator circuit 19 as respective inputs. As for the output for the comparator circuit 19, a signal corresponding to deviation of the existing speed of rotation of rotor with respect to the reference speed is obtained, and said signal is amplified by means of an amplifier 21 and applied to the base terminal of the control transistor 22. This transistor 22 is connected in series between the power source 18 and the driving circuit as described above, and a voltage between the emitter and the collector of the transistor 22 is controlled by a level of the signal applied to said base, the voltage thus controlled being applied as a power source to the aforesaid driving circuit. Thus, a driving electric power for the motor is controlled so that the rotor is to be rotated at a constant speed in response to the reference signal.

In order to detect the speed of revolution of the rotor, an output signal in response to the speed of revolution of the rotor is obtained using a tacho generator as shown in FIGS. 1 and 4 to serve as an input for the comparator circuit 19 through the mixing circuit 30. There is another method without using the tacho generator, in which wave forms of currents flowing in the coils $L_1$ and $L_2$ or their induced voltages are utilized. According to this method, the driving current flows alternately in the coils $L_1$ and $L_2$ during the time of motor being driven, so that said current can be utilized, or there is another method, in which during the time when a current is not flown in the coils $L_1$ and $L_2$, an induced voltage produced in these coils is applied as an input for said comparator circuit. Either method can be employed.

Further, a pulse signal is applied to the transistor 22 and speed controlling can be taken place by varying a phase angle of said pulse. It is also possible that an applied voltage to Hall generator 7 or 15 is controlled by applying a deviation signal from the comparator circuit 19, without using the control transistor 22, to the switching circuits 8 or 16 connected in series to the Hall generators, resulting in the flow of driving current fed to the coils $L_1$ and $L_2$ being controlled. In this case, it is advantageous because no transistor such as transistor 22 having a great capacity is required.

Figure 7:
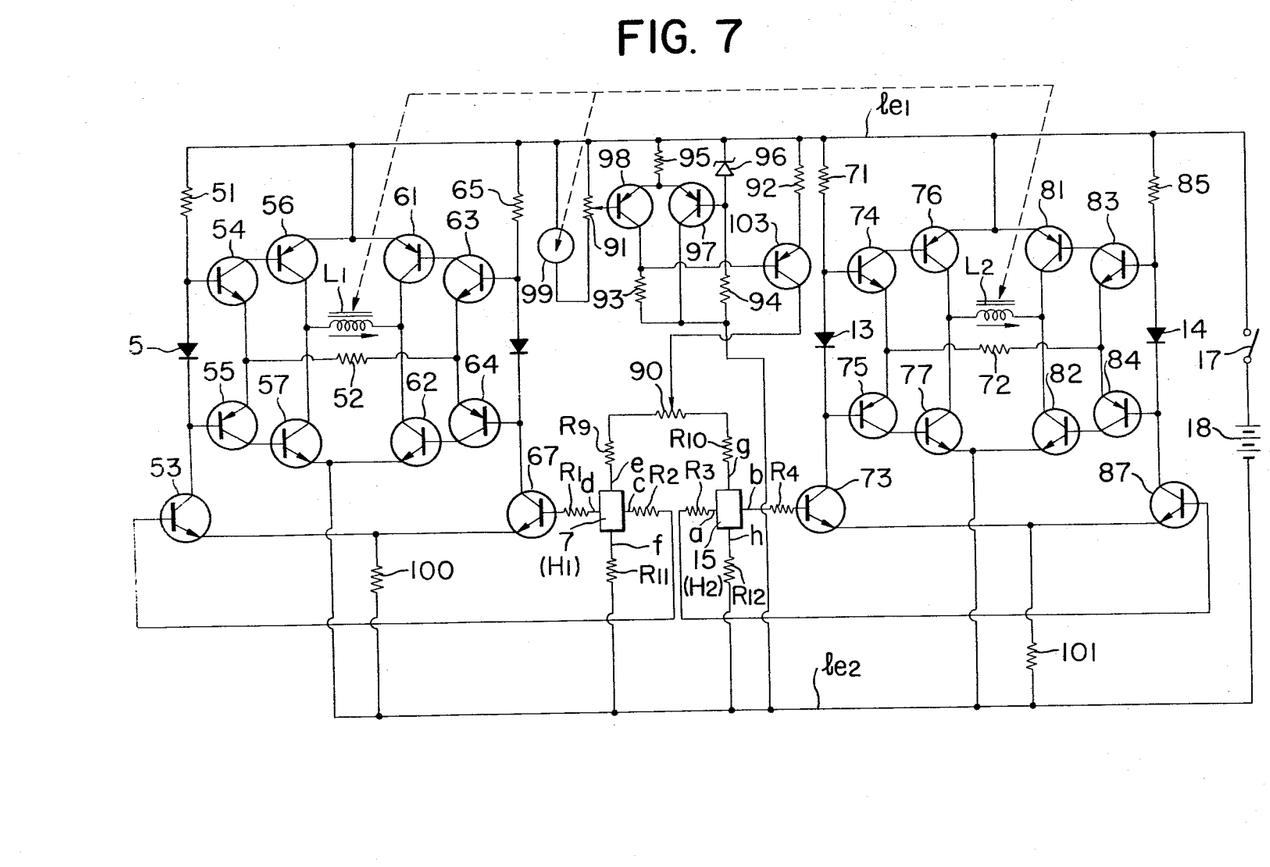
FIG. 7 is a circuit diagram for the modified driving means and speed control means of the DC brushless motor shown in FIG. 1.

Referring now to FIG. 7, another modified example of the driving means and speed control means of the DC brushless motor according to the present invention will be described. Similar reference characters refer to elements common to that of FIG. 1 throughout this circuit diagram. Further, there is constructed similar to FIG. 1 in such points that two sets of driving circuits are symmetrically arranged and only one source battery is used. The motor comprises two Hall elements 7 ($H_1$) and 15 ($H_2$), a stator having two field coils $L_1$ and $L_2$, and a rotor comprising a permanent magnet. In FIG. 7, resistors 51, 65, 71 and 85 are load resistances for first stage transistors 53, 67, 73 and 87 and diodes 5, 6, 13, and 14 are connected between collector terminals of said transistors and said resistances. A group of transistors 54, 55, 63 and 64 and a group of transistors 74, 75, 83 and 84 are exciting stage transistors which form respective complimentary amplification circuits. Then, a group of transistors 56, 57, 61 and 62 and a group of transistors 76, 77, 81 and 82 form respective circuits of output stages. Resistor 52 is a resistance for current flow or protection of excessive current, which is connected to the emitter terminal common to transistors 54 and 55 and to the emitter terminal common to transistor 63 and 64. Resistor 72 is also a resistance for corrent flow or protection of current, which is connected to the emitter terminal common to transistors 74 and 75, and transistors 83 and 84. Resistor 100 is an emitter resistance common to transistors 53 and 67, and resistor 101 is an emitter resistance common to transistors 73 and 87. Line conductor $l_{e1}$ is connected to plus terminal of the power source 18 and line conductor $l_{e2}$ is connected to minus terminal of the power source 18.

The tacho generator 99 is provided with coils arranged diagonal to the coils $L_1$ and $L_2$, respectively, and rotates along with the rotor to produce a signal in response to the number of revolution. Transistors 97 and 98 have their emitters connected together and the transistor 98 has its base terminal connected to said tacho generator 99 through a variable resistor 91. Current control transistor 103 has its base terminal connected to the collector terminal of said transistor 98. The transistor 103 has its collector terminal connected to input terminals e and g of said Hall generators $H_1$ and $H_2$ through a variable resistor 90. Resistor 92 is connected to the emitter terminal of said control transistor 103 and the resistor 93 is connected to the collector terminal of the transistor 98. Zener diode 96 and resistor 94 are connected in series to the power source 18. These elements 91, 92, 93, 94, 95, 96, 97, 98, 99 and 103 form a speed control circuit for the motor. Particularly, transistors 97 and 98 form a differential type comparator.

The operation of the present embodiment will now be described. The switching operation of a driving current flowing in the coils $L_1$ and $L_2$ caused by Hall elements is similar to the mode of embodiment as shown in FIG. 1 so that it will briefly be described. It is now supposed that the Hall generator $H_2$ is positioned to face to N-pole, and an output voltages, which are expressed by $Va > Vb$, are produced. This voltages cause the first stage transistor 87 in the driving circuit to turn ON condition, remaining the other transistor 73 in OFF condition. Whereby, transistor 84, 82, 76, and 74 among exciting stage and output stage transistors will be turned ON condition to form a circuit, that is, plus terminal of power source 18 — power switch 17 — line conductor $l_{e1}$ — transitor 76 — coil $L_2$ — transistor 82 — line conductor $l_{e2}$ — minus terminal of power source 18, and a driving current flows in the coil $L_2$ in a direction as indicated by a full line, to cause the rotor to be rotated in a normal direction. Next, when S-pole of rotor comes to a position in opposed to the Hall generator $H_1$, output voltages which are expressed by $Vc < Vd$ are produced at output terminals c and d of the Hall generator $H_1$, and the transistor 67 will be turned ON condition so that transistors 64, 62, 56, and 54 among exciting stage and output stage transistors will be turned ON condition. Whereby, a circuit is formed that is, plus terminal of power source 18 switch 17 — line conductor $l_{e1}$ — transistor 56 — coil $L_1$ — transistor 62 — line conductor $l_{e2}$ — minus terminal of power source 18, and a driving current flows in the coil $L_1$ in a direction as indicated by a full line, to cause continuing the rotor to be rotated in a normal direction. Then, when S-pole of rotor comes to a position in opposed to the Hall generator $H_2$, output voltages, which are expressed by $Va < Vb$ are produced at output terminals a and b of the Hall generator $H_2$, and the transistor 73 will be turned ON condition so that transistors 75, 77, 81, and 83 will be turned ON condition, and a current flows in the coil $L_2$ in a direction opposite to that shown by the full line, to cause the rotor to further be rotated in its normal direction. Then, when N-pole of rotor comes to a position in opposed to the Hall generator $H_1$, output voltages, which are expressed by $Vc > Vd$ are produced at output terminals c and d of the Hall generator $H_1$, and the transistor 53 will be turned ON condition so that transistors 55, 57, 61, and 63 will be turned ON condition, and a current flows in the coil $L_1$ in a direction opposite to that shown by the full line, to cause the rotor to further be rotated in its normal direction and in this way the rotor is maintained to be rotated.

With this rotation of the rotor, the tacho generator 99 provides an output signal corresponding to rotational speed of rotor. This output voltage is properly divided by a variable resistor 91 and applied to the transistor 98 to provide an output signal at its output terminal. A current flowing in the resistor 95 is constant. When the potential difference between the base terminals of line conductor $l_{e1}$ and transistor 98 increases as the number of revolution of tacho generator increases, the conductive current flow of transistor 98 will increase and the potential of the collector will elevate with respect to the potential of line conductor $l_{e2}$. Thus, a base current of transistor 103 will reduce, and its collector current will reduce to lower a level of input current into the Hall generators $H_1$ and $H_2$. Then, output voltages of said Hall generators $H_1$ and $H_2$ will reduce, resulting in the current flow applied to coils $L_1$ and $L_2$ being reduced to lower the level of torque produced causing the rotor to be retarded. Zener diode 96 provides a reference voltage signal to apply the motor a reference signal which controls motor at a constant speed.

With respect to connection of the coil units as shown in FIG. 3, the connection has previously been described in which as described in the foregoing, coils $L_{1a}$ and $L_{1b}$ are connected in series and coils $L_{2a}$ and $L_{2b}$ are also connected in series, but this mode of connection may possibly be changed by the provision of switching means Co into a connection, that is, respective coils are connected in series to form a connection in the form of coil $L_{1a} - L_{2a} - L_{1b} - L_{2b}$.

According to the DC brushless motor of the invention, there are used only two independent coils with the driving means specifically constructed so that a current in the reversed direction is applied to the two coils according to the rotational position of rotor whereby the direction of torque produced may be reversed. As thus constructed, this will double the utilization efficiency, which has been low in the conventional construction with four coils used, and will be conveniently applied for a micro-motor having winding in a limited space. Further, in view of positional relationship between the magnetic conversion elements such as Hall generators and the permanent magnet rotor, a signal corresponding to the rotational position is produced by said magnetic conversion elements and said signal is electrically treated by the driving circuit so that currents in exactly reverse phase are alternately applied to said two coils.

Further, torque produced may be varied by the provision of means which is able to vary the mode of connection with respect to said two coils. Further, a speed control circuit is provided, said circuit serving to control electric power applied to the driving circuit by detecting an output of tacho generator, a conductive current in coil, or an induced voltage produced during the time when a driving current is not flown in the coil.

I claim:
1. A DC brushless motor comprising:
   a rotor having magnetic poles of opposite polarities thereof;
   a stator member having one pair of flux-producing windings positioned in torque-producing relation with said rotor, each of said windings having a conductor extended in parallel with a direction of the rotation axis of said rotor, and respective windings being arranged in a spaced relation to one another by substantially 90°;

a pair of magnetic conversion means positioned in flux-sensing relationship to said magnetic poles; and driving control means having a single pair of driving circuits for applying a flux-producing current to respective ones of said windings, each of said driving circuits including two symmetrically disposed transistor circuits, each comprising a first transistor having its input terminal coupled to a different one of the output terminals of one of said magnetic conversion means and a second transistor having its output terminal coupled to a terminal of one of said windings, and means for interconnecting an output terminal of said first transistor in one of said transistor circuits with an input terminal of said second transistor in the other one of said transistor circuits, so that said flux-producing current selectively flows through one of the two windings every 90° as said rotor rotates and the direction of said current is reversed every 180° as said rotor rotates, thereby torque is produced to continuously rotate said rotor unidirectionally.

2. A DC brushless motor according to claim 1, said driving control means further comprising speed control means, said means including means for detecting the speed of revolution of said rotor, means for producing a reference signal, and comparator means for comparing outputs from said detecting means and reference signal producing means.

3. A DC brushless motor according to claim 1, wherein said magnetic conversion means comprising;

a pair of Hall generators positioned in fixed relation to said rotor with an angular displacement from each other corresponding to an electrical displacement between said rotor magnetic poles of 90°.

4. A DC motor according to claim 3, wherein said Hall generators are connected to a power supply source through rotor speed controlling means so as to control the magnitude of the output signal from the respective Hall generators.

5. A DC motor according to claim 3, wherein said Hall generators are connected to a power supply source through speed control means so as to control the magnitude of the output signal from the respective Hall generators.

6. An electric motor energizable from a source of uni-direction potential, comprising;

a rotor having magnetic poles of mutually opposite polarities thereon;

a single pair of flux-producing windings positioned in torque-producing relation with said rotor;

a pair of signal generators positioned in flux-sensing relationship to said magnetic poles;

means for controlling the speed of said rotor including a controlling circuit arranged to apply output signal magnitude control power to said signal generators which are energized thereby; and driving control means having a single pair of bridge-type driving circuits for applying an exciting current to respective said windings, each of said bridge-type driving circuits each including two symmetrically disposed transistor circuits, each comprising a first transistor having its input terminal coupled to a different one of the output terminals of one of said magnetic conversion means and a second transistor having its output terminal coupled to a terminal of one of said windings, and means for interconnecting an output terminal of said first transistor in one of said transistor circuits with an input terminal of said second transistor in the other one of said transistor circuits, so that said flux-producing current selectively flows through one of the two windings every 90° as said rotor rotates and the direction of said current being reversed every 180° as said rotor rotates, whereby torque is produced to continuously rotate said rotor unidirectionally.

7. An electric motor according to claim 6, wherein said speed control means includes a tacho-generator connected to detect the speed of revolution of said rotor, means for producing a reference signal, and comparator means for comparing outputs from said tacho-generator and said reference signal producing means.

* * * * *

UNITED STATES PATENT OFFICE
CERTIFICATE OF CORRECTION

Patent No. 3,898,544                     Dated August 5, 1975

Inventor(s) KINZI TANIKOSHI

It is certified that error appears in the above-identified patent and that said Letters Patent are hereby corrected as shown below:

Column 3, line 16, "itsi" and "side" to read -- its -- and -- sides --.

Signed and Sealed this seventh Day of October 1975

[SEAL]

Attest:

RUTH C. MASON
*Attesting Officer*

C. MARSHALL DANN
*Commissioner of Patents and Trademarks*